Aug. 16, 1932.    W. CHRISTENSEN    1,872,121
ROD WEEDER
Filed Jan. 7, 1931
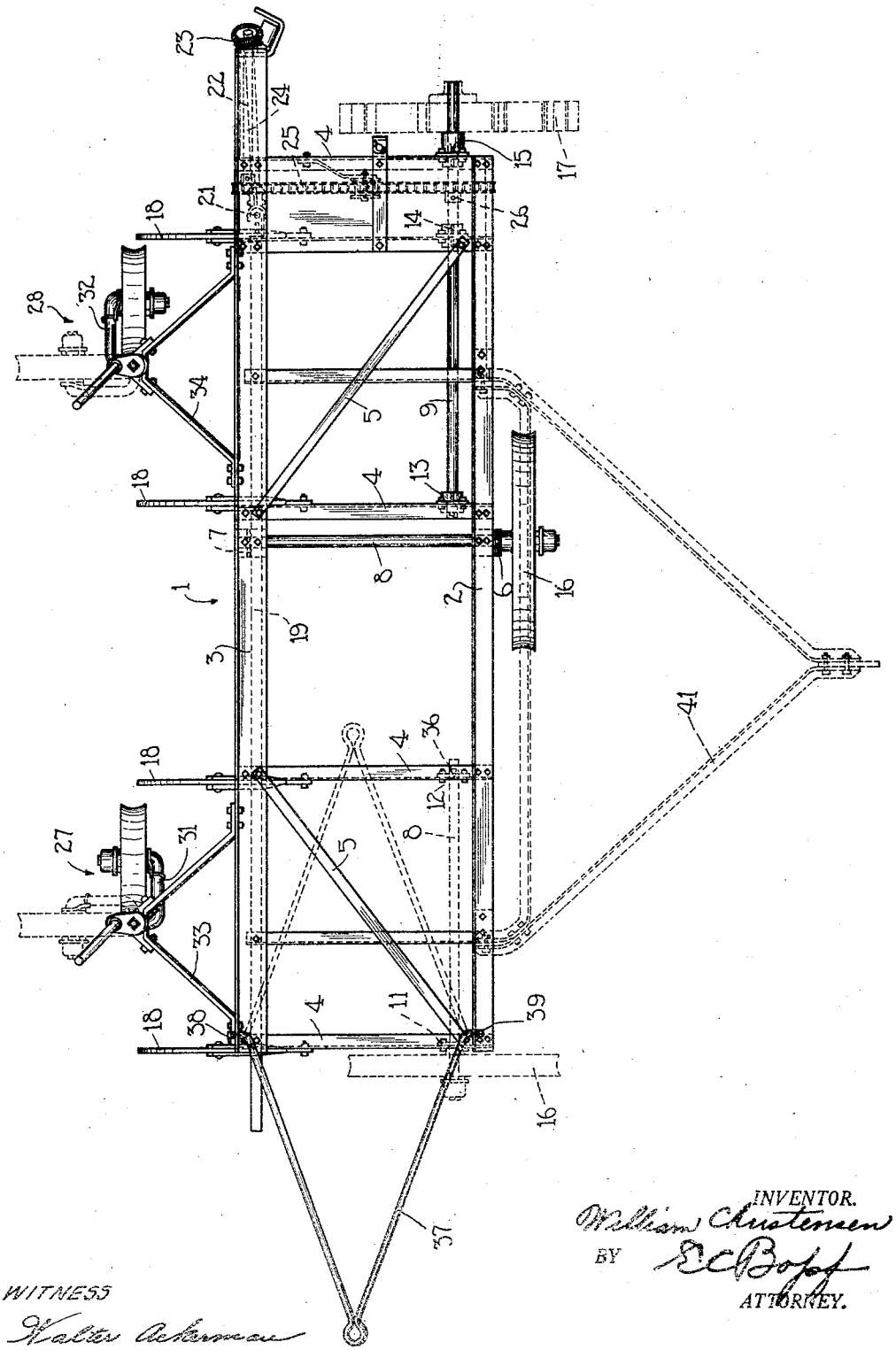
INVENTOR.
William Christensen
BY
ATTORNEY.
WITNESS Patented Aug. 16, 1932

1,872,121

UNITED STATES PATENT OFFICE

WILLIAM CHRISTENSEN, OF MOLINE, ILLINOIS, ASSIGNOR TO DEERE & COMPANY, OF MOLINE, ILLINOIS, A CORPORATION OF ILLINOIS

ROD WEEDER

Application filed January 7, 1931. Serial No. 507,169.

The present invention relates to agricultural implements, and more particularly to rod weeders and a means and method for arranging such implement for transport from one field to another, or along highways and the like.

With the increased use of power apparatus on farms, there has come about an increase in the size and width of the agricultural implements adapted to be used with such apparatus, such as power operated tractors and the like. With the increase in the width of such implements, particularly rod weeders, manufacturers have been confronted with the problem of arranging or adapting such implements so that they can be readily drawn along a highway, through gates, and around and into the various farm buildings. Heretofore, in some instances, small transport trucks have been furnished on which the implement could be positioned so as to transport the same with its frame endwise, similar to the manner in which it is common at present to transport a grain binder and similar implements. Such construction, however, involves additional axles, wheels, attaching means, and the like which are used only when moving the implement and which quite naturally add a considerable sum to the manufacturing cost and selling price of the implement.

It is one object of the present invention, therefore, to obviate some of the defects of the prior art in this respect and to provide in such implements, particularly a rod weeder, a wheeled supporting and driving structure which is capable of supporting and driving the implement when in operation and yet capable of being arranged in position at right angles to the normal operative positions for transport purposes without involving the addition of superfluous parts. More particularly the present invention has for one of its objects the provision of a supporting means for the wheels of a rod weeder which is so constructed and arranged that one of the wheels thereof may be positioned to allow the implement to be moved endwise, thus reducing the overall width of the implement when moving the same, without requiring any substantial number of extra parts or the like.

Other objects and advantages of the present invention will be apparent to those skilled in the art after a consideration of the following detailed description of the preferred embodiment, taken in conjunction with the accompanying drawing in which is shown a top plan view of a rod weeder incorporating the features of the present invention; the full line position of the parts indicating the arrangement of the implement when it is adapted to be transported while the dotted line position of the parts indicates the arrangement when the implement is in its operative or working position.

Referring now to the drawing, the reference numeral 1 indicates, in its entirety, the elongated frame of the rod weeder. The frame 1 comprises a front angle bar 2, a rear angle bar 3, fore and aft extending members 4 joining the front and rear bars, and cross braces 5. As is usual in such framework, the members 4 and the cross braces 5 reinforce the frame 1 against distortion under the forces imposed during the operation of the device.

Depending bearing brackets 6 and 7, having longitudinally aligned holes, are secured to frame 1 near the center thereof and preferably to the front and rear angle bars 2 and 3, respectively, for a purpose to be described later.

Extending longitudinally of the elongated frame 1 are aligned supporting wheel axle 8 and drive wheel axle 9. Axles 8 and 9 are respectively supported in journal bearings 11 and 12, and 13, 14 and 15, and these bearing members are preferably secured to the vertical legs of the frame members or angle bars 4. Axle 8 is of sufficient length so that it may also be journaled in bearing brackets 6 and 7 when the implement is arranged for transport. The axles 8 and 9 extend beyond the ends of the frame 1 to receive, respectively, supporting wheel 16 and drive wheel 17.

Goosenecks 18 are secured to the rear part of the frame 1, being bolted to the vertical flanges of members 4. These goosenecks 18, at their lower ends, receive and support the rotatable weeder rod 19 in the usual manner. One end of the weeder rod 19 is provided with a universal joint 21 and a short shaft section 22 which is driven by means of intermeshing gears 23 from a second short shaft section 24 journaled on the rear frame bar 3. The shaft 24 is driven by means of a sprocket chain 25 trained over and driven by a sprocket 26 fixed or otherwise secured to the driving axle 9 in the usual manner.

From the drawing it will be noted that the supporting wheel 16 and drive wheel 17 are arranged at each end of the frame 1 adjacent the front bar 2. The rear of the elongated frame 1 is supported by a pair of caster wheels 27 and 28 provided with the usual vertical spindle structure and crank axle arrangement 31 and 32, respectively. The vertical spindles of each of the caster wheels 27 and 28 are journaled in castings secured respectively to triangular brackets 33 and 34. These brackets may be bolted or otherwise secured to the rear frame bar 3 of the frame 1.

A conventional draft member, shown in dotted lines at 41, is pivotally connected to the front of the frame 1 in the usual manner for drawing the implement.

The above description is applicable to the rod weeder when it is arranged for operative or working position, and in which some of the parts are shown in dotted lines as pointed out above. When the implement is to be arranged for transport, such is accomplished by simply rearranging a few of the parts of the implement as will be clear from the following description. To provide for this rearrangement the retaining cotter pin 36 is removed from the axle 8, and the axle 8 and supporting wheel 16 are removed intact from the journal bearings 11 and 12. The axle 8 is then mounted in the longitudinally aligned holes of the bearing brackets 6 and 7 in a manner shown in full line position in the drawing. The shaft 8 is again retained against endwise displacement by the cotter pin 36.

When the implement is arranged for transport the drive wheel 17 is not used and it is therefore removed from the axle 9 and may be carried on the frame 1 or in any other desired manner. The draft member 41 may be removed and carried on the frame or swung upwardly and retained in a vertical position.

To draw the implement in transport an auxiliary draft member 37 is provided. As shown in the drawing, this draft member 37 is in the form of a V-shaped rod provided with turned ends 38 and 39 which hook into perforations in one end of the members 2 and 3. During operative or working arrangement of the implement, the draft member 37 normally lays back across the second frame member 4.

When the implement is arranged for transport, as shown in full lines in the drawing, and since the caster wheels 27 and 28 are capable of swinging through an angle greater than 90°, as soon as the draft is applied to the draft member 37 the caster wheels swing around to the position shown in full lines in the drawing. The implement then becomes a three wheel truck supported on two caster wheels at one side and a non-dirigible wheel 16 mounted on the axle 8 at the other side.

It is a simple matter to arrange the implement for transport and, as has been described, requires only removing the supporting wheel 16, axle 8 and drive wheel 17, and mounting the axle 8 and wheel 16 in such a manner that the wheel 16 is arranged adjacent the front angle bar 2 and parallel therewith.

While I have shown and described in connection with the accompanying drawing the preferred embodiment of the present invention, it is to be understood that my invention is not to be limited to the specific means shown and described, but that, in fact, widely different means may be employed in the practice of the broader aspects of my invention.

What I claim and desire to secure by Letters Patent is:—

1. An implement comprising an elongated frame having spaced front and rear parallel frame bars connected by fore and aft frame members, axles supported on the fore and aft frame members on opposite sides of the frame adjacent the front frame bar and parallel thereto, supporting means for said frame, including caster wheels mounted on the rear frame bar and spaced laterally at each side of the center, non-dirigible wheels carried on the axles, and longitudinally aligned bearing brackets on the front and rear frame bars for receiving one of the axles to position the wheel journaled thereon parallel with the front frame bar for transporting the implement endwise.

2. An implement comprising an elongated frame having spaced front and rear parallel frame bars connected by fore and aft frame members, supporting means for said frame, said means including caster wheels at the rear of the frame and spaced laterally at each side of the center, a transverse drive axle journaled on the frame parallel with the front frame bar and adjacent thereto, a drive wheel fixed on the outer end of said drive axle, a supporting axle removably supported on the frame and aligned with the drive axle and a supporting wheel journaled on the outer end of said supporting axle, and longitudinally aligned bearing brackets secured to the front and rear frame bars between their ends and adapted to receive the supporting axle to position said wheel adjacent to and parallel with the front frame bar for transporting the implement endwise.

3. In combination with a rod weeder comprising a frame, an axle extending transversely of the frame and removably mounted thereon, and supporting means for the frame including a pair of caster wheels adapted to swing in an angle greater than 90° in one direction from their normal longitudinal position with respect to the frame and a non-dirigible wheel journaled on said axle, of means on said frame for supporting said axle longitudinally of the frame and on a line between said caster wheels.

4. An implement comprising an elongated frame, supporting means for said frame, including caster wheels at the rear of the frame and spaced laterally at each side of the center, a pair of transversely aligned brackets at each side of the frame, wheel supported axles in said brackets, and a pair of longitudinally aligned brackets on the frame in which one of said axles may be supported to position the wheel thereon parallel with the frame for transporting the implement endwise.

5. An implement comprising an elongated frame, means for supporting said frame for operation of the implement, said means comprising a caster wheel and a pair of transversely disposed axles mounted on said frame, each axle having a supporting wheel thereon, and means including a longitudinally aligned bracket on the frame, for receiving one of said axles to position the wheel thereon transversely to the frame for supporting the same to enable it to be transported endwise.

6. An implement comprising an elongated frame, means for supporting said frame for operation of the implement, said means comprising a caster wheel, a wheel supported axle, and means rigidly mounted on said frame for supporting said axle to position said axle transversely of said frame, and auxiliary means including longitudinally aligned brackets mounted on said frame in which said axle may be supported to position said axle longitudinally of said frame to support the same so that it may be transported endwise.

7. An implement comprising an elongated frame including a pair of spaced caster wheels and a pair of transversely disposed axles on said frame, each axle having a supporting wheel thereon, one of said wheels being detachable from its axle, the other wheel and axle being detachable from the frame, and means including a bracket fixed to the frame midway between said caster wheels for receiving said axle to position the wheel thereon transversely to the frame, whereby said frame may be supported solely on said caster wheels and said other wheel and axle through said bracket for endwise transportation.

8. An implement comprising an elongated frame, means for supporting said frame comprising a caster wheel, a wheel supported axle, means rigidly mounted on said frame for supporting said axle to position said axle transversely of said frame, a main draft member connected to the front end of the frame to draw the implement in operating position, an auxiliary means rigidly mounted on said frame in which said axle may be supported to position said axle longitudinally of said frame, and an auxiliary draft member pivotally connected to one side of the frame for transporting the implement endwise and adapted to normally lie back on top of the frame when the implement is being drawn by the main draft member.

9. An implement comprising an elongated frame having spaced front and rear parallel frame bars connected by fore and aft frame members, axles supported on the fore and aft frame members on opposite sides of the frame adjacent the front frame bar and parallel thereto, supporting means for said frame, including caster wheels mounted on the rear frame bar and spaced laterally at each side of the center, non-dirigible wheels carried on the axles, longitudinally aligned bearing brackets on the front and rear frame bars for receiving one of the axles to position the wheel journaled thereon parallel with the front frame bar, a draft member connected to the front frame bar to draw the implement in operating position, and an auxiliary draft member pivotally mounted on one end of the front and rear frame bars adapted to normally lie across the fore and aft frame members and pivotable outwardly for transporting the implement endwise.

In witness whereof, I hereunto subscribe my name this 31st day of December, 1930.

WILLIAM CHRISTENSEN.